United States Patent
Kataoka et al.

(10) Patent No.: US 8,330,757 B2
(45) Date of Patent: Dec. 11, 2012

(54) METHOD OF GENERATING MESH FOR ANALYSIS

(75) Inventors: Ichiro Kataoka, Hitachinaka (JP); Ichiro Nishigaki, Ishioka (JP); Yoshimitsu Hiro, Yokohama (JP); Masayuki Hariya, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 1062 days.

(21) Appl. No.: 11/876,803

(22) Filed: Oct. 23, 2007

(65) Prior Publication Data

US 2008/0106547 A1 May 8, 2008

(30) Foreign Application Priority Data

Oct. 24, 2006 (JP) .................. 2006-288605

(51) Int. Cl.
*G06T 17/00* (2006.01)

(52) U.S. Cl. ...................... 345/420; 345/441

(58) Field of Classification Search .................. 345/420, 345/441
See application file for complete search history.

(56) References Cited

U.S. PATENT DOCUMENTS

| 6,573,892 | B1* | 6/2003 | Yang et al. ............... 345/421 |
| 7,050,951 | B1* | 5/2006 | Tautges et al. ................ 703/2 |
| 2005/0116950 | A1* | 6/2005 | Hoppe ..................... 345/423 |
| 2007/0097117 | A1* | 5/2007 | Chien et al. .............. 345/420 |

FOREIGN PATENT DOCUMENTS

| JP | 09-311951 | 12/1997 |
| JP | 2001-229407 | 8/2001 |
| JP | 2004-171045 | 6/2004 |
| JP | 2005-332183 | 12/2005 |

* cited by examiner

*Primary Examiner* — Maurice L McDowell, Jr.
(74) *Attorney, Agent, or Firm* — Antonelli, Terry, Stout & Kraus, LLP.

(57) ABSTRACT

It is possible to automatically correct a six-plane body mesh pattern so as to satisfy the required quality. A device for generating a mesh pattern for analysis comprises: surface mesh generating device for generating a surface mesh pattern of an analysis object by acquiring shape model data on the analysis object and mesh control data including required quality of an analysis mesh model; internal mesh generating device for generating an internal mesh pattern of the analysis object according to the generated surface mesh pattern; device for calculating the element quality of surface meshes; quality evaluating device for evaluating calculated element quality according to the required quality; and mesh correction device for shifting a surface mesh node point not satisfying the required quality in the direction to improve the quality.

7 Claims, 9 Drawing Sheets

METHOD OF GENERATING MESH FOR ANALYSIS

BACKGROUND OF THE INVENTION

The present invention relates to a device for generating a mesh pattern for analysis and in particular, to a technique for automatically generating six-plane body mesh data satisfying a required quality from CAD (Computer Aided Design) data.

The analysis using the finite element method divides an analysis object into small mesh elements each having a predetermined shape and acquires a change of a physical amount generated in each element of the mesh pattern. The method is widely used in structure analysis, thermal conduction analysis, fluid analysis, and the like. For example, it is known that as a mesh pattern for analysis, quadrangular meshes are generated on a surface of a shape model of the analysis object generated by the CAD and the internal portion is divided according to the quadrangular meshes so as to generate six-plane body (a cube or a rectangular parallelepiped) meshes for analysis.

Moreover, as is disclosed in JP-A-9-311951, when an element in the mesh is deformed during analysis, the surface of the analysis object including the deformation is extracted and a new mesh is regenerated for the entire shape model having the extracted surface and the analysis calculation is continued. Another method suggested is performed manually by an analysis staff. That is, the analysis staff shifts the node point of the mesh which has caused deformation and re-divides the elements in the necessary portion so as to repeat a mesh pattern local shape operation and re-generates the mesh pattern.

However, in the conventional technique including the invention disclosed in JP-A-9-311951, no consideration is taken on extraction of a deformed mesh not satisfying a required quality during generation of a six-plane body mesh pattern or its reproduction so as to automatically correct the mesh. For example, each time a deformed mesh is generated, correction should be made by shifting a mesh node point by using a set of sequential manual procedures. This requires a complicated operation.

SUMMARY OF THE INVENTION

It is therefore an object of the present invention to provide a device for generating a mesh pattern for analysis capable of automatically correcting a six-plane body mesh so that the mesh satisfies a required quality.

In order to achieve the aforementioned object, the present invention provides a device for generating a mesh pattern for analysis, the device comprising: surface mesh generating means for generating a surface mesh pattern of an analysis object by acquiring shape model data on the analysis object and mesh control data including required quality of an analysis mesh model; internal mesh generating means for generating an internal mesh pattern of the analysis object according to the surface mesh pattern generated by the surface mesh generating means; mesh quality evaluating means for evaluating mesh quality of the surface mesh pattern generated by the surface mesh generating means according to the required quality; and mesh correction means for shifting a surface mesh node point not satisfying the required quality, according to the evaluation result obtained by the quality evaluating means, in the direction to improve the quality.

That is, according to the present invention, quality of a mesh pattern is evaluated temporarily created is evaluated according to a required quality and a correction is made by shifting a node point of a surface mesh according to the evaluation result so as to improve the mesh pattern, thereby obtaining a mesh pattern having no distortion and satisfying the required quality by automatic correction. Moreover, after a node point is shifted, internal meshes inside the object volume are created by the boundary element method so as to regenerate six-plane body meshes. Thus, by correcting a mesh on the surface, it is possible to correct distortion of the internal meshes all at once by correcting a mesh on the surface.

Here, the mesh quality includes an internal angle at each node point of the mesh, distortion of the mesh, a twist degree of the mesh, and the like. The internal angle is an angle defined by a pair of elementary segments, or lines constituting a mesh. If the internal angle near 90 degrees, the mesh has little distortion and approaches the target quality.

It should be noted that upon a mesh correction, the mesh correction means calculates the shift direction and the shift amount of the node point on the surface required to satisfy the mesh quality and shifts the node point.

In this case, the mesh quality evaluation means further evaluates quality of internal meshes generated by the internal mesh means according to the required quality and the mesh correction means can shift a node point of an internal mesh not satisfying the required quality according to the evaluation result of the quality evaluation means, in the direction to improve the quality. Thus, it is possible to evaluate the mesh quality according to the required quality, make a correction by shifting a node point of a surface mesh according to the evaluation result, and correct internal meshes. This can generates a 3D mesh pattern satisfying the required quality without requiring a manual correction of a mesh.

Moreover, the mesh correction means calculates the shift direction and the shift amount of the node point to improve quality of the surface mesh pattern and can shift the node point so that the position of the node point after shifted is within a permissible range from the external surface and the external form line of the shape model.

Furthermore, the mesh correction means can select a node point of a mesh having an internal angle farthest from 90 degrees and calculate the shift direction and the shift amount of the node point so that the internal angle of the node point approaches 90 degrees. In this case, when the node point to improve the surface mesh quality is on the external surface or the external form line of the shape model, it is preferable that the mesh correction means shift the node point so that the node point after shifted is on the external surface or the external form line of the shape model. Furthermore, when the node point to improve the surface mesh quality is one of two node points on the external form line of the shape model, the mesh correction means can rotate, shift, or enlarge/reduce the line connecting the two node points so as to shift the node point to improve the quality and together with this, can shift node points existing on the line connecting the two node points on the external surface.

According to the present invention, it is possible to realize a device for generating a mesh pattern for analysis capable of automatically correcting a six-plane body mesh pattern satisfying the required quality.

DETAILED DESCRIPTION OF THE EMBODIMENTS

Description will now be directed to the best mode for carrying out the present invention.

Figure 1:
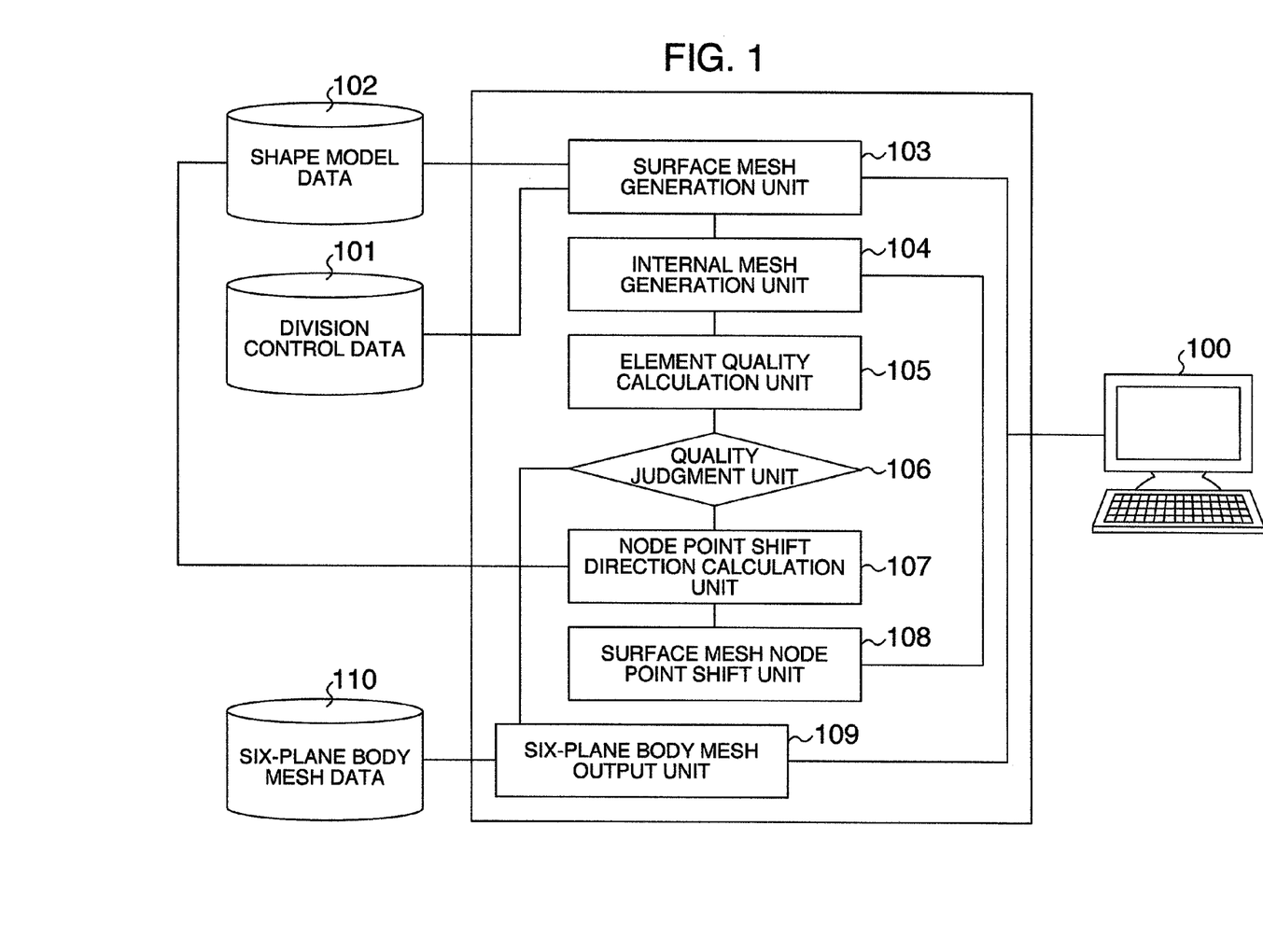
FIG. 1 shows an entire configuration of a device for generating a mesh pattern for analysis according to an embodiment of the present invention.

FIG. 1 shows an entire configuration of a device for generating a mesh pattern for analysis according to an embodiment of the present invention. As shown in the figure, the device for generating a mesh pattern for analysis according to the embodiment includes: a computer 100 having input means such as a keyboard, operation processing means, a display, and the like; storage means 101 for storing division control data as mesh control data; storage means 102 for storing shape model data on an object to be analyzed; and storage means 110 for storing generated six-plane body mesh data.

The operation processing means of the computer has a surface mesh generation unit 103, an internal mesh generation unit 104, an element quality calculation unit 105, a quality judging unit 106, a node point shift direction calculation unit 107, a surface mesh node point shift unit 108, and a six-plane body mesh output 109. These components are realized by executing programs.

The shape model data inputted is data expressing a shape of an analysis object generated by the CAD system or the like as a six-plane body mesh generation object. The division control data relates to data on the element dimension and required quality when generating meshes and is inputted from outside to the storage means 101 and set. The element dimension is a set value such as 2.0 mm which specifies the size for element division in the shape model data. The required quality indicates an internal angle in a mesh element, distortion, and twisted degree. The internal angle is an angle defined by node points constituting a mesh element. When the internal angle is around 90 degrees, the mesh has little distortion and approaches the required quality.

The surface mesh generation unit 103 inputs shape model data and division control data and generates quadrangular surface meshes by arranging node points on the external form line and the external surface constituting the shape model data. The internal mesh generation unit 104 arranges node points along the node points on the external surface inside the shape volume to generate internal meshes, thereby generating a six-plane body mesh pattern.

Figure 2:
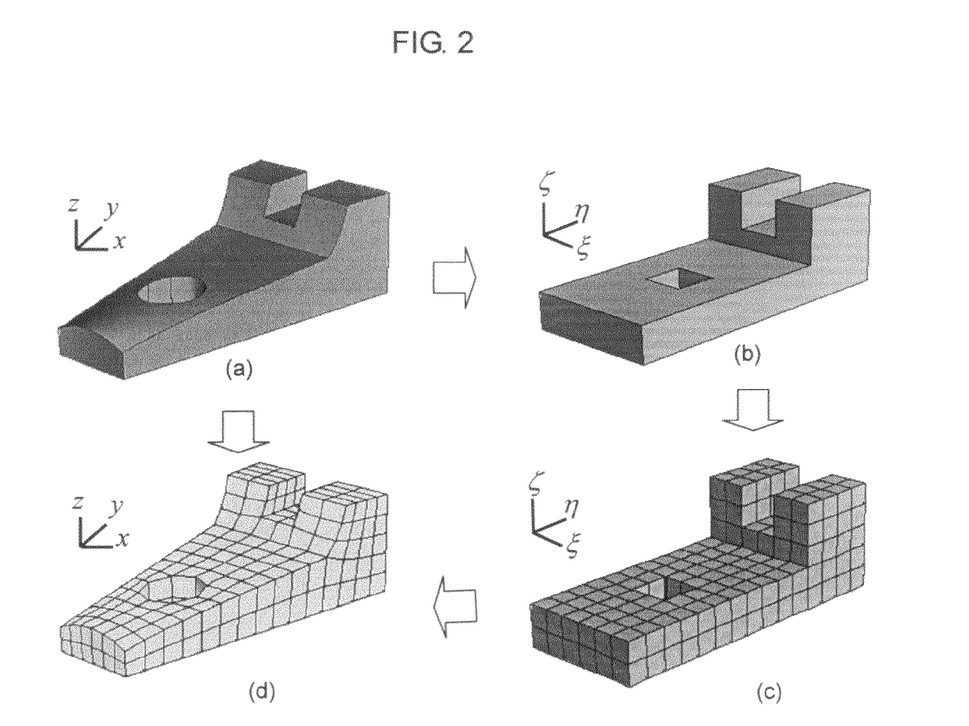
FIG. 2 explains a six-plane body mesh pattern generation method according to an embodiment.

The six-plane body mesh pattern generation method can employ the known method. For example, as shown in FIG. 2, firstly, according to a shape model (a) of an analysis object, an approximate model (b) is generated by approximating external surface of the shape model having a curved external form line and a curved face by a segment and a plane domain parallel to one of the three orthogonal axes. This approximate model is a solid model indicating a shape, where external form lines constituting the shape are assigned to lines parallel to $\xi$, $\eta$, and $\zeta$ axes corresponding to the 3-dimensional x, y, z. The solid model is formed by cuboid blocks.

Node points are arranged at an identical interval on the external form lines and faces of the approximate model in accordance with the mesh size corresponding to the required quality. The node points are connected by segments, each being parallel to any one of the three orthogonal axes to form quadrangular surface meshes. Furthermore, according to the surface meshes, internal meshes are generated in the approximate model so as to generate a mapping model (c) of six-plane body meshes of cubes or cuboids.

Each of the node points of the mapping model is mapped onto the external form line and the external surface of the shape model (a). The mapped node points are connected by rectilinear edges to generate a six-plane body mesh model (d) for analysis. Upon this mapping, meshes in the six-plane mesh model (d) may be distorted by non-similarity between the shape model (a) and the similar model (b) and the obtained mesh pattern may not satisfy the required quality.

The element quality calculation unit 105 calculates or evaluates the element quality so as to judge whether each of the mesh elements of the six-plane body meshes generated by the internal mesh generation unit 104 satisfies the required quality. Here, as the mesh element evaluation method, for example, it is possible to use the angle formed by node points (four internal angles of each quadrangular mesh), distortion of each element (Jacobian of a volume), or stretch of each element. As for the distortion, it is an index as follows. When the Jacobian is 1, a volume of a cube is indicated. As the value goes apart from 1, the shape goes farther from the cube. In addition to this, it is possible to use an evaluation value indicating a mesh distortion, twist, and warp as parameters of the element quality calculation.

The quality judging unit 106 judges whether there exists a mesh having, for example, an internal angle equal to or greater than a threshold value (such as 160 degrees) among the internal angles calculated by the element quality calculation unit 105 and the calculation results of the distortion and the stretch. If yes, a mesh deviating from the required quality is displayed on the display to present it to a user. Moreover, if all the meshes satisfy the required quality, the six-plane body mesh data is displayed on the display via the six-plane body mesh output unit 109 so as to be presented to the user and stored as the six-plane mesh data in the storage means 110.

On the other hand, when the judgment result obtained by the quality judging unit 106 indicates that a mesh not satisfying the required quality exists, data on the mesh is outputted to the node point shift direction calculation unit 107. In order to satisfy the required quality, the node point shift direction calculation unit 107 shifts a node point constituting the mesh not satisfying the required quality and corrects the internal angle, the distortion, and the stretch of the mesh. Here, the node point shift direction calculation unit 107 obtains a shift direction and a shift amount of the node points. When a node point is on the external form line of the shape model, the node point shift direction is decided so that the destination of the node point is also on the external form line. Thus, the node point shift direction calculation unit 107 obtains the shift direction and the shift amount of the node point according to the shift restriction condition of the node point and outputs them to the surface mesh node point shift unit 108.

The surface mesh node point shift unit 108 shifts the node point on the surface mesh according to the shift direction and the shift amount of the node point. Thus, correction is made so that the internal angle, distortion, and stretch of the surface mesh satisfy the required quality and the corrected surface mesh data is returned to the internal mesh generation unit 104.

The internal mesh generation unit 104 inputs the corrected surface mesh data and again corrects the internal meshes in the volume. After this, the corrected six-plane body mesh model is outputted to the element quality calculation unit 105. The element quality calculation unit 105 calculates or evaluates the element quality for judging whether each of the mesh elements of the corrected six-plane body mesh model satisfies the required quality and outputs the evaluation result to the quality judging unit 106.

Thus, the shift for correction of a surface mesh node point and internal mesh correction are repeated until the mesh elements of the corrected six-plane body mesh model satisfy the required quality in the judgment by the quality judging unit 106. The six-plane body mesh data finally generated is stored into the storage means 110 from the six-plane body mesh output unit 109 and displayed on the display to be presented to the user.

Figure 3:
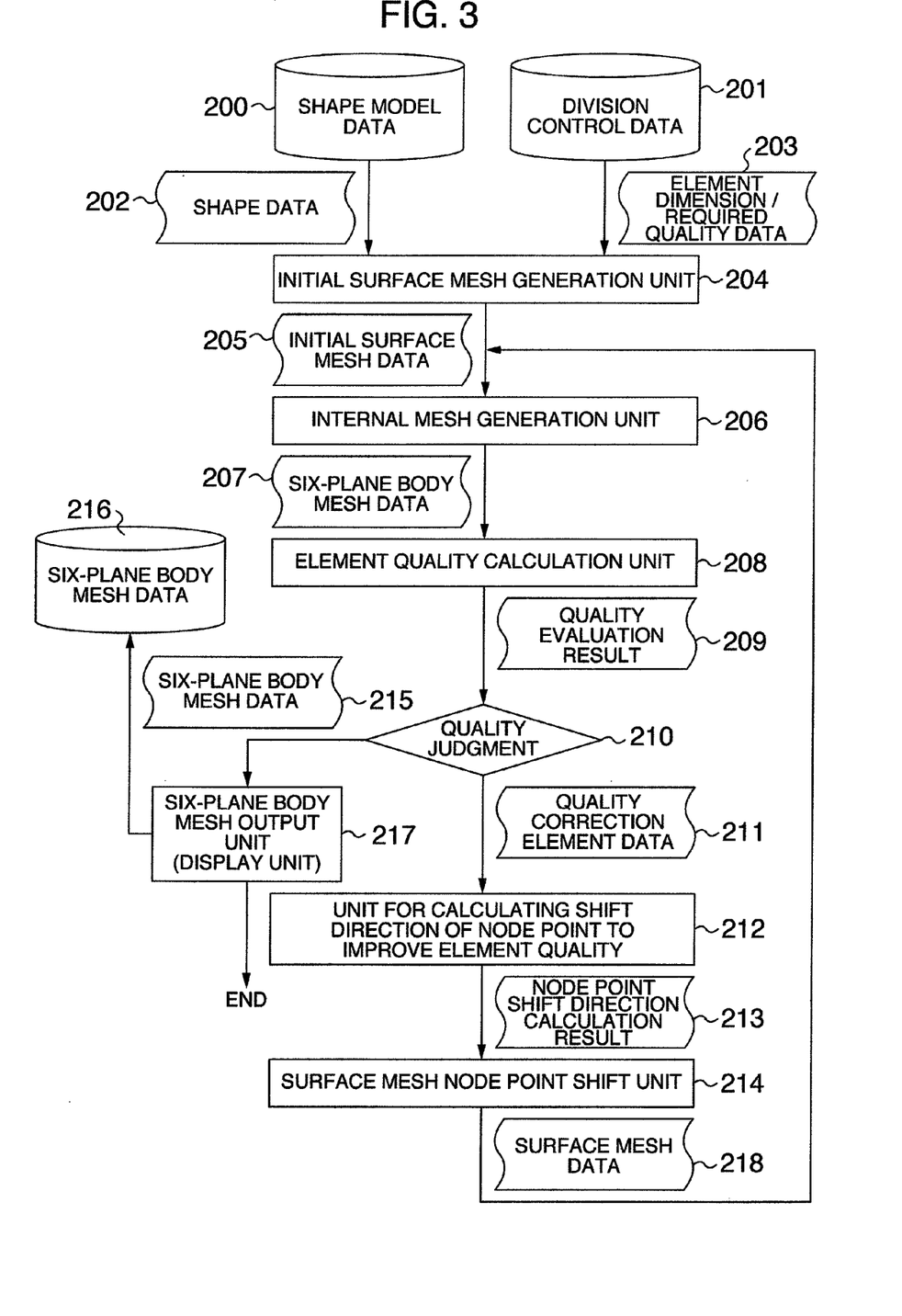
FIG. 3 shows a data flow in the embodiment of FIG. 1.

Explanation will be given on detailed processing operations of the aforementioned embodiment with reference to the flowcharts of FIG. 3 and FIG. 4 and FIG. 5 to FIG. 9. FIG. 3 shows a data flow in the embodiment corresponding to the configuration shown in FIG. 3. Among shape model data 200 and division control data 201, shape data 202 and element dimension/required quality data 203 are inputted to an initial surface mesh generation unit 204. According to the procedure shown in FIG. 2, the initial surface mesh generation unit 204 generates quadrangular surface meshes on the external surface of the shape model from the shape data and the element dimension data. The generated quadrangular surface mesh data is transmitted as the initial surface mesh data 205 to an internal mesh generation unit 206. The internal mesh generation unit 206 arranges node points inside the volume from the quadrangular surface mesh data by using the boundary element method so as to generates six-plane body meshes.

Here, it is possible to obtain a node point coordinate value on the external surface of the shape model (solid model) corresponding to the node point on the surface of the mapped model in FIG. 2. According to the node point coordinate value, the node point inside the volume is interpolated to calculate an initial value of the internal node point coordinate value. After the node point on the external surface is fixed, the node point coordinate value inside the volume is given as a solution of a partial differentiation equation. When the Laplace equation is used as the partial differentiation equation, which is expressed by solid model coordinates (x, y, z) and three orthogonal axes ($\xi$, $\eta$, $\zeta$), the equation as follows is obtained.

$$\frac{\partial^2 \xi}{\partial x^2} + \frac{\partial^2 \xi}{\partial y^2} + \frac{\partial^2 \xi}{\partial z^2} = 0$$

$$\frac{\partial^2 \eta}{\partial x^2} + \frac{\partial^2 \eta}{\partial y^2} + \frac{\partial^2 \eta}{\partial z^2} = 0$$

$$\frac{\partial^2 \zeta}{\partial x^2} + \frac{\partial^2 \zeta}{\partial y^2} + \frac{\partial^2 \zeta}{\partial z^2} = 0$$

[Expression 1]

Since the node point coordinate values on the external surface of the solid model to be mapped are known, it is possible to obtain the node point coordinate values inside the solid model by giving the coordinates as a function of ($\xi$, $\eta$, $\zeta$) to solve the Expression 1. The calculation is repeatedly performed until the solutions are converged.

Thus, the internal mesh generation unit 206 generates six-plane body mesh data 207 as an output and transmits it to an element quality calculation unit 208. The element quality calculation unit 208 calculates whether the element meshes of the six-plane body mesh pattern satisfy the required quality of the division control data.

It is possible to set the following as the required quality evaluation parameters: whether an internal angle defined by node points constituting a six-plane body mesh element is deviated from 90 degrees, whether a volume of the six-plane body mesh element is deviated from the Jacobian value (=1) of a cube, a stretch evaluating whether the six-plane body mesh element is similar to a cube or a rectangular parallelepiped, a twist degree of the six-plane body mesh element, a warp degree of the mesh element, and the like. As for the calculation expression of an internal angle, the angle is calculated from the coordinate values of the node points of the six-plane body mesh element. Moreover, the distortion is obtained by calculating a volume from the node point coordinate values of the six-plane body mesh element by Jacobian of Expression 2 as follows.

$$J = \frac{\partial(u, v, w)}{\partial(x, y, z)}$$

[Expression 2]

The stretch can be obtained by calculating a distance between the node points calculated from the node point coordinate values of the six-plane body mesh element and the ratio of the length of the longest side against the length of the shortest side. The aspect ratio is obtained by calculating the ratio of the longitudinal length against the lateral length from the node point coordinate values of the six-plane body mesh element.

After evaluating each of the six-plane body mesh elements to determine whether the required quality is satisfied, the quality evaluation results 209 are sent to the quality judgment 210. The quality judgment 210 judges whether the element quality is to be improved. If the judgment results do not require improvement of the element quality, the generated six-plane body mesh data 215 is sent to a six-plane body mesh output 217 so as to display an image of the six-plane body meshes on a display or the like for the user. Moreover, the displayed six-plane body mesh data 214 is stored in storage means 216.

On the other hand, if the element quality is to be improved, data 211 indicating the mesh element to be improved is sent to a node point shift direction calculation unit 212. The node point shift direction calculation unit 212 for improving the element quality shifts a node point constituting the mesh element not satisfying the required quality so as to make a correction to satisfy the required quality. The correction is made by calculating the shift direction and shift amount of the node points of the mesh element.

Here, the shift direction of the node point is decided so as to satisfy the position where the internal angle defined by the node points constituting the mesh element is 90 degrees, the position where the Jacobian approaches 1, and the position where an inter-node point distance approaches the element dimension of the required quality. In this case, the node point among the node points constituting the mesh element and farthest from 90 degrees is shifted while fixing the other node points. Thus, by calculating the shift direction and the shift amount of only one node point, it is possible to obtain an ideal node point position satisfying the required quality. After the ideal node point position is obtained, the calculation results 213 of the shift direction and the shift amount of the node point are transmitted to the surface mesh node point shift unit 214.

The surface mesh node point shift unit 214 shifts the node point according to the shift direction and the shift amount of the node point to be shifted and outputs the corrected surface mesh data 218 to the internal mesh generation unit 206. The internal mesh generation unit 206 generates internal meshes inside the volume from the corrected surface mesh data 218 and outputs the corrected six-plane body mesh data to the element quality calculation unit 208. The element quality calculation unit 208 calculates quality of the mesh element and the quality judgment 210 judges whether the element satisfies the target element quality.

Figure 4:
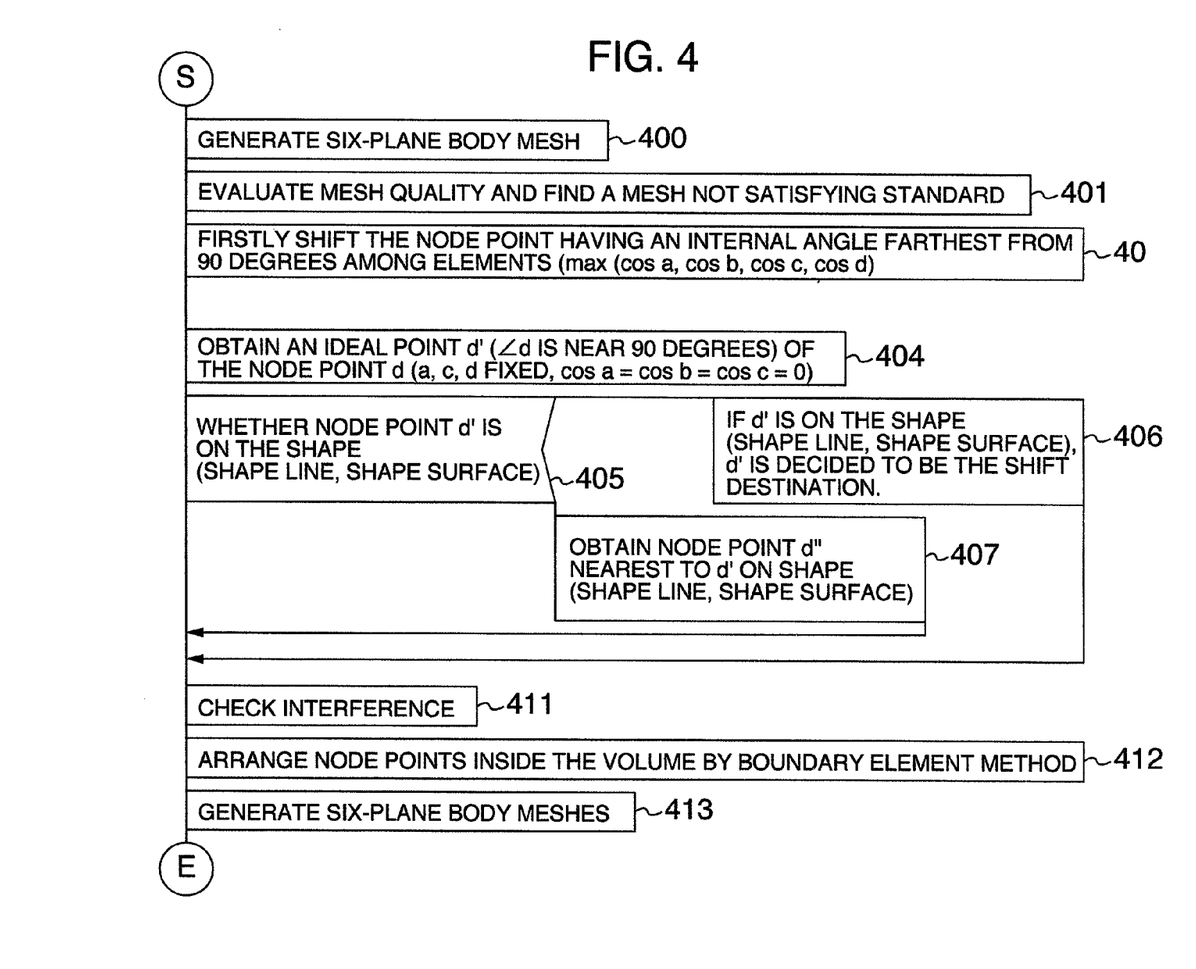
FIG. 4 is a flowchart showing a main part of the embodiment of FIG. 1.

FIG. 4 is a flowchart indicating the flow of processes performed as follows: six-plane body meshes are generated; quality of each mesh element is calculated to decide whether the quality of the mesh element satisfies the required quality; according to the result of the quality judgment, the shift direction and the shift amount of a node point are calculated to improve the element quality; according to the calculation result, the node point of the surface mesh is shifted. Firstly, internal meshes of the shape model are generated to obtain a six-plane body mesh model (step 400).

Figure 5:
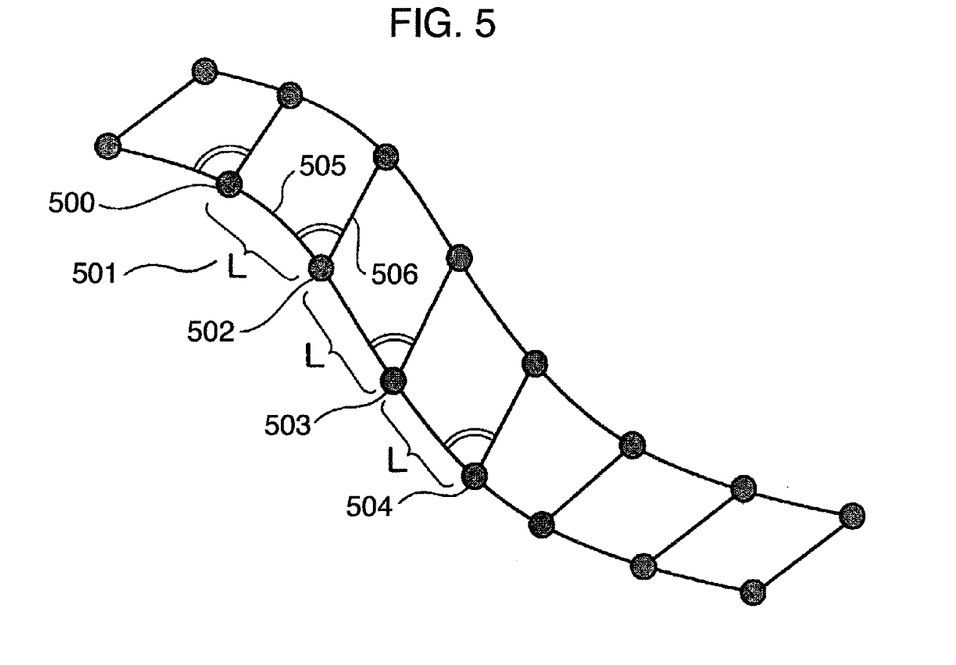
FIG. 5 explains a method for evaluating quality of a six-plane body mesh pattern generated by arranging node points on a shape model.

Next, the element quality calculation unit 208 and the quality judgment 210 perform quality evaluation of the meshes in the six-plane mesh model to find a mesh element not satisfying the required quality and obtain quality correction element data 211 (step 401). For example, as shown in FIG. 5, when generating a six-plane body mesh pattern by arranging node points on the shape model, node points 500 to 504 are arranged at an identical interval on the external form line 505 constituting the shape. These node points 500 to 504 are connected to the adjacent node points, respectively, by edge lines 506 so as to generate meshes. Here, if the external form line 505 is a straight line, the internal angle of the mesh element defined by the edge line 506 and the external form line 505 is near 90 degrees and the mesh elements are hardly deformed.

On the other hand, if the external form line 505 is a free curved line and the node points 500 to 504 arranged at an identical interval are connected to adjacent node points, a mesh element having an internal angle deviated from 90 degrees is generated. In this case, it is necessary to shift a corresponding node point so that the internal angle approaches 90 degrees. Here, the internal angle is geometrically obtained as an angle defined by node points from the coordinate values of the four node points constituting the mesh element.

Figure 6:
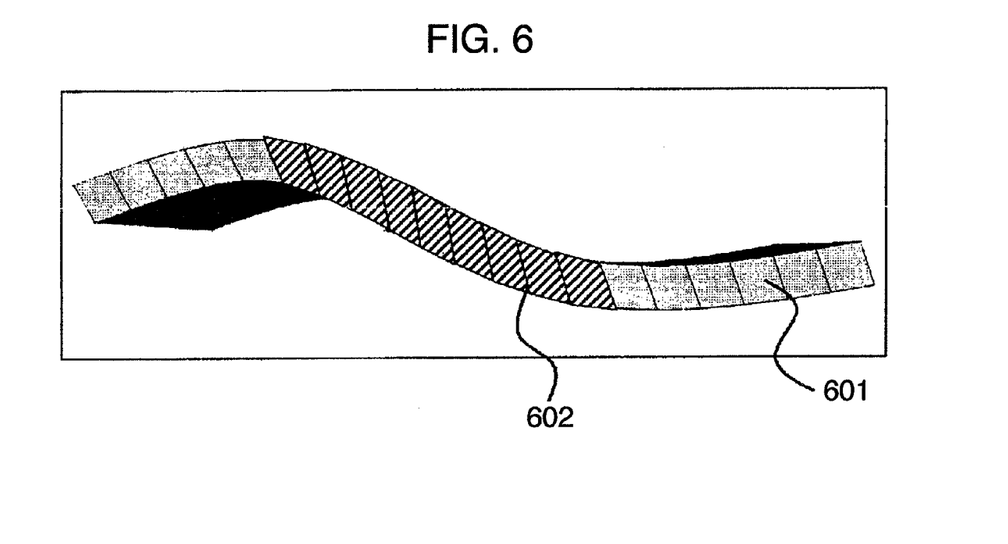
FIG. 6 explains a method for evaluating element quality in the case of a three-dimensional six-plane body mesh pattern.

Moreover, in the case of 3D six-plane body mesh pattern as shown in FIG. 6, when node points are arranged at an identical interval on the external form line, the edge line connecting node points is nearly parallel or vertical to the external form line for a portion 601 where the external form line is a straight line. However, for a portion 602 where the external form line is curved, some of the edge lines connecting node points may not be vertical to the external form line, thereby generating a mesh having an internal angle deviated from 90 degrees.

Figure 7:
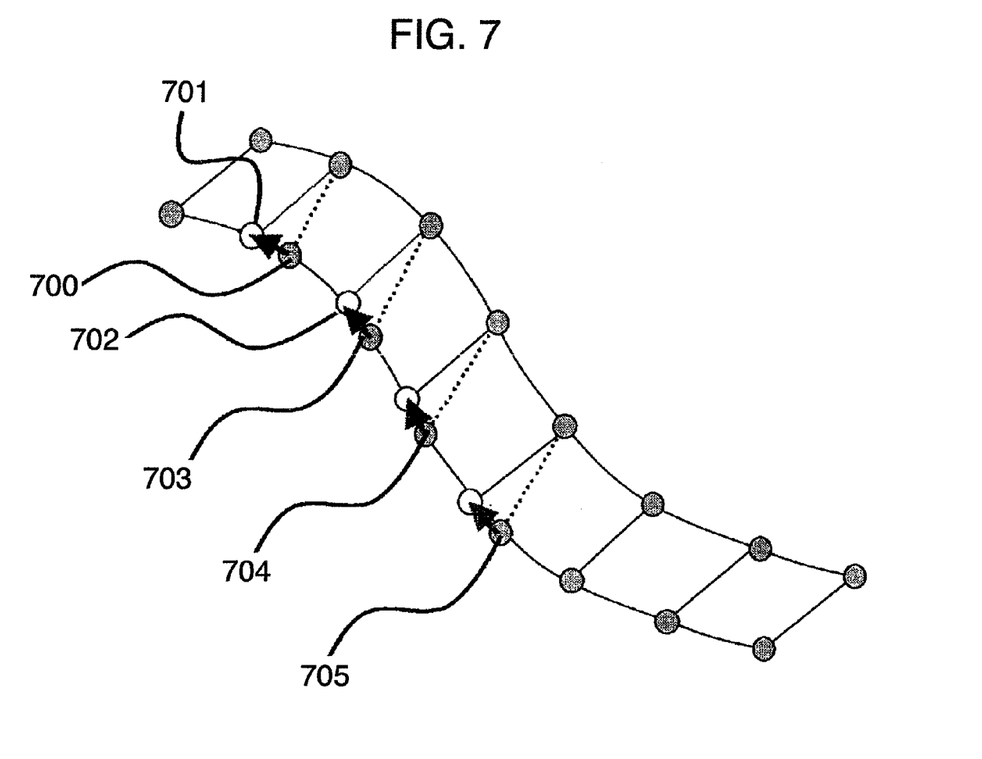
FIG. 7 explains a method how to improve quality of the six-plane body mesh pattern.

Referring to FIG. 7, explanation will be given on a process to improve distortions of the mesh elements in the example of FIG. 5 so as to satisfy the required quality. In FIG. 7, in the curved portion of the external form line, the node points 700, 703, 704, 705 are shifted for the mesh elements having an internal angle deviated from 90 degrees, so that the internal angle approaches 90 degrees. Here, when deciding the shift destination positions of the node points 701, 702, the shift destination points should also be within a permitted difference range specified on the external form line since the original node points are on the external form line. That is, when a node point exists on the external form line of the shape model or on the external surface, the node point is shifted along the external form line or the external surface. Accordingly, it is checked whether the node point to be shifted is on the external form line or on the external surface. If the node point is found to be on the external form line, the node point is shifted along the external form line so that the internal angle of the node point approaches 90 degrees. After the node point is shifted, it is confirmed that the node point after shifted is on the external form line on the external surface according to the coordinates of the node point.

Figure 8A:
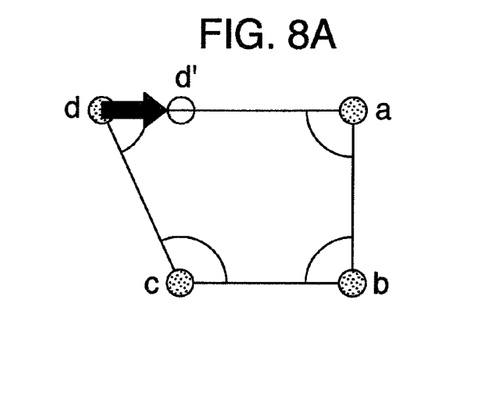
FIGS. 8A and 8B explain a method for calculating the shift direction and the shift amount of a node to improve the quality.
Figure 8B:
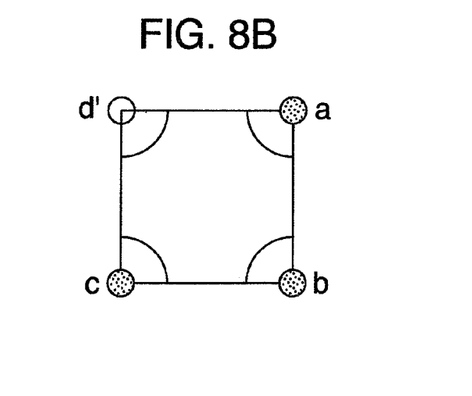

Referring to FIGS. 8A and 8B, explanation will be given on a specific example of a method for calculating the a shift direction and a shift amount of a node point. When the internal angle should be near 90 degrees according to the required quality, a quadrangular mesh shown in FIG. 8A is extracted as a mesh element to be improved. In this case, the node point d having an internal angle farthest from 90 degrees among the node points constituting the quadrangular mesh is selected as a node point to be corrected (step 402). For the node point d to be corrected, the three other node points a, b, c of the same mesh are fixed, and the shift destination of the node point d is decided to be an ideal node point d' having an internal angle near 90 degrees (step 404). Here, when deciding the ideal node point d', the other three node points a, b, c are fixed so as to have an internal angle 90 degrees, respectively, and the coordinate position of the ideal node point d' is calculated to decide the shift direction and the shift amount. This generates a corrected surface mesh as shown in FIG. 8B.

The coordinate of the ideal point d' is calculated from the coordinate values of the four node points. The inner product F (a, b, c, d) of the node points is calculated by Expression 3. Thus, it is possible to obtain cos ∠ "a" of the internal angle of the node point "a" by Expression 4.

$$F(a,b,c,d) = (\cos \angle a, \cos \angle b, \cos \angle c, \cos \angle d) \quad \text{[Expression 3]}$$

$$\cos \angle a = \frac{(\vec{a} - \vec{d})(\vec{c} - \vec{d})}{|a - d||c - d|} \quad \text{[Expression 4]}$$

The node point having an internal angle farthest from 90 degrees is obtained by Expression 5.

$$\underset{\{a,b,c,d\}}{\text{Max}} (\cos \theta) = d \quad \text{[Expression 5]}$$

Here, for example, if the node point d is near 1 at max (cos ∠d), the node point d is made to be a node point to be shifted and the node points a, b, c are fixed (cos ∠a=0, cos ∠b=0, cos ∠c=0), thereby calculating a coordinate of an ideal node point d'. By keeping the coordinates of the three node points a, b, c in the fixed state and assuming that the internal angle of each of the three node points is near 90 degrees, the position of the ideal node point d' can be decided.

Here, if the node point d is on the external surface corresponding to the shape model of the six-plane body mesh model, check is made to decide whether the coordinate position of the ideal node point d' in the shape model is on the external surface. In this case, an error allowance range is set and if the coordinate position is within the range, it is decided that the ideal node point d' is on the external surface.

Moreover, if the node point d is on an external form line corresponding to the shape model of the six-plane body mesh model, check is made to decide whether the ideal node point d' is on the external form line within the error allowance range (step 405). If the ideal point d' is on the external surface or on the external form line, the ideal point d' is decided to be the shift destination (step 406). Moreover, if the ideal node point d' is not on the external surface or the external form line, an ideal node point d" on the external surface or the external form line near the ideal node point d' is arranged as the shift destination (step 407). The ideal node point d" is calculated by mapping a point near the ideal node point d' on the external form line of the shape model.

Thus, the node point shift direction calculation unit 212 sets an ideal node point d' or d" as a node point of the shift destination to improve the element quality and transmits the shift direction and shift amount calculation results 213 to the surface mesh node point shift unit 214.

The surface mesh node point shift unit 214 shifts the node point according to the shift direction and shift amount calculation results 213 and performs an interference check to decide whether an interference with another mesh element is caused by the shift of the node point, for example (step 411). According to the node point shift method based on the internal angle according to the present embodiment, it is considered that no interference occurs. Accordingly, this interference check may be omitted. According to the surface mesh pattern thus corrected, node points are arranged inside the volume by the boundary element method (step 412) to generate a six-plane body mesh pattern (step 413).

Figure 9:
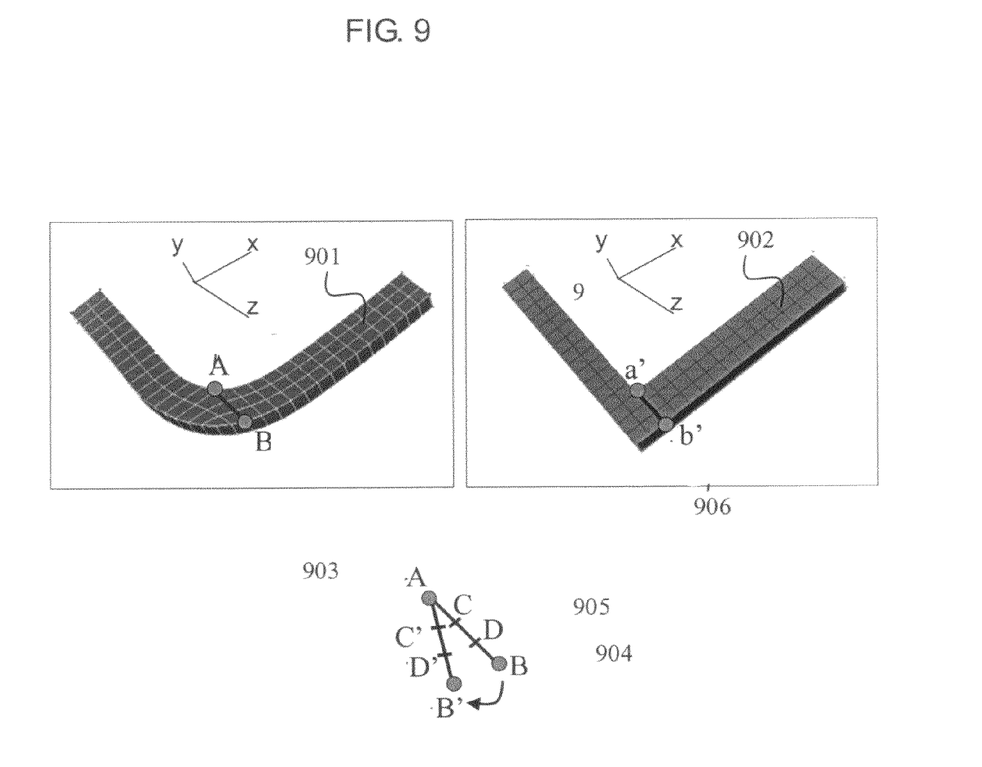
FIG. 9 explains a method for calculating the shift direction and a shift amount of a node on an external surface to improve the quality.

Referring to FIG. 9, explanation will be given on the method for shifting a node point on the external surface. By referencing node points a' and b' at the boundary portion where the mesh elements on the external form line of the mapped model 902 orthogonally intersect, node points A and B of the mesh elements of the six-plane body mesh model 901 corresponding to the node points a' and b' are obtained. The node point B on the external form line of the six-plane body mesh model 901 is shifted to B'. Here, the node points a' and b' at the orthogonally intersecting boundary portion of the mapped model 902 are on the external form line of the six-plane body mesh model 901. By shifting a node point of the six-plane body mesh model 901, the node point on the external surface of the six-plane body mesh model 901 is also shifted. Accordingly, the mesh elements can be corrected all at once.

In this case, when the node point B is shifted to B', the node points C and D on the external surface are also shifted. Accordingly, the node points C and D are also shifted to decide the positions of the node points C' and D'. That is, a line connecting the node points A and B is searched and the edge line AB is shifted to the edge line AB' so as to decide the shift directions and the shift amounts of the node points on the external surface.

The edge line shift method is performed as follows. Vectors of the edge line AB and the edge line AB' are calculated and the affine transformation (rotation, shift, expansion/contraction) is performed to obtain the shift direction and the shift amount of the edge line so as to decide positions of the node points C' and D' corresponding to the node points C and D.

That is, when the node point concerning improvement of quality of a surface mesh is one of two node points on the external form line of the shape model, the line connecting the two node points is rotated, shifted, or expanded/contracted so as to shift the node point whose quality is to be improved and together with this, node points existing on the line connecting the two node points are also shifted.

Figure 10:
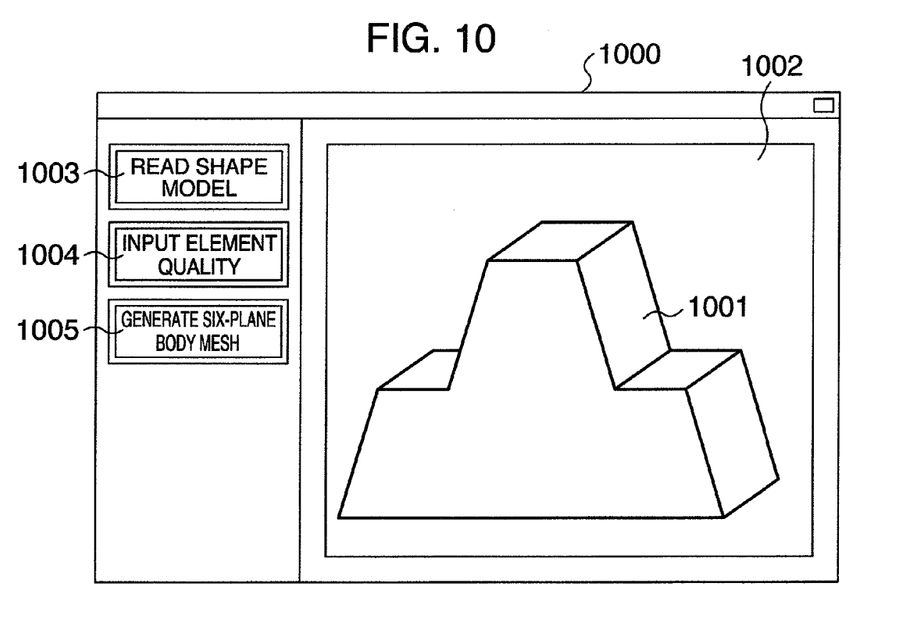
FIG. 10 shows an example of the operation screen according to the embodiment as a display example of a shape model for which an analysis mesh pattern is to be generated.

FIG. 10 shows an example of a display screen 1000 presenting a six-plane body mesh model to a user. A shape model 1001 is displayed in a first region 1002 of the screen 1000. That is, when a shape model read button 1003 is pressed, the shape model 1001 appears on the screen. When a required quality input button 1004 is pressed after the shape model data is read, it is possible to set parameters concerning an element dimension and element quality. When a six-plane body mesh generation button 1005 is pressed after setting the element dimension, a six-plane body mesh model is generated for the shape model 1001.

Figure 11:
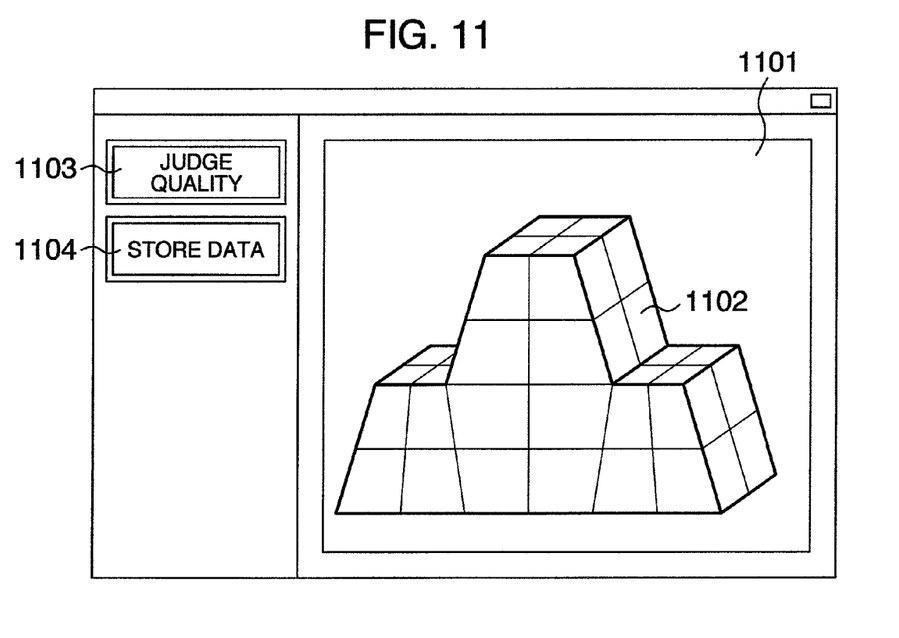
FIG. 11 shows an example of the operation screen according to the embodiment as a display example of a generated a six-plane body mesh model.

FIG. 11 shows an example of screen displaying the generated six-plane body meshes on the display screen 1000. A six-plane body mesh model image 1102 is presented on the region 1101 for the user. Here, if the user presses a quality judgment button 1103, as shown in the region 1200 of FIG. 12, the meshes satisfying the element quality are distinguished from the meshes not satisfying the element quality according to the quality judgment results. For example, the mesh elements 1201 not satisfying the element quality are highlighted. Moreover, when the user presses a data storage button 1104 in FIG. 12, the generated six-plane body mesh model data is stored.

Figure 12:
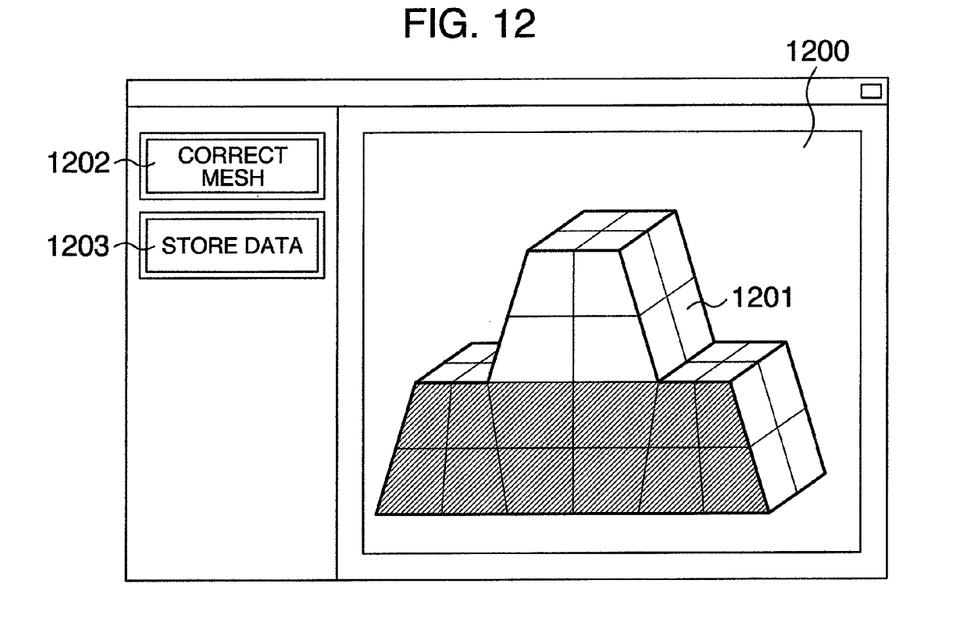
FIG. 12 shows an example of the operation screen according to the embodiment as a display example of a generated six-plane body mesh model in which meshes not satisfying the required quality are emphasized.
Figure 13:
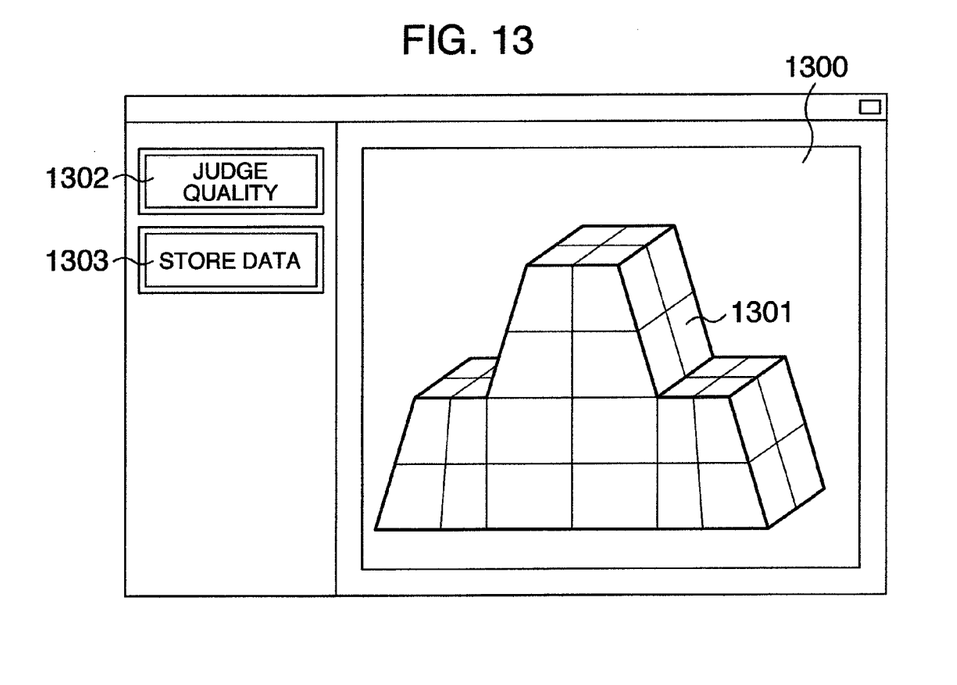
FIG. 13 shows an example of the operation screen according to the embodiment as a display example of a generated six-plane body mesh model in which meshes not satisfying the required quality have been corrected.

If a mesh not satisfying the target element quality exists, the user presses a mesh correction button 1202. Then, the node point of the surface mesh of the mesh block not satisfying the element quality is shifted and the internal mesh is generated by using the boundary element method to regenerate a corrected six-plane body mesh. The six-plane body mesh thus corrected is displayed as the six-plane body mesh model 1301 in the region 1300 as shown in FIG. 13. If the quality judgment body 1302 is pressed for the corrected six-plane body mesh model 1301, the mesh element quality is checked again. Moreover, when the data storage button 1303 is pressed, the corrected six-plane body mesh model 1301 is stored in the storage means.

As has been explained above, according to the present embodiment, quality of a created mesh pattern is evaluated according to the required quality. According to the evaluation result, a node point of the surface mesh is shifted to improve the quality, thereby automatically correcting the mesh pattern having no distortion and satisfying the required quality.

Moreover, after shifting the node point, meshes inside the volume is generated by the boundary element method to regenerate a six-plane body mesh pattern. Accordingly, it is possible to correct the internal mesh distortion all at once by correcting the surface mesh pattern.

The invention claimed is:

1. A device for generating a mesh pattern formed of meshes for analysis, the device comprising: surface mesh generating means for generating a surface mesh pattern having quadrangular meshes, of an analysis object by acquiring shape model data on the analysis object and mesh control data including required quality of an analysis mesh model; internal mesh generating means for generating an internal mesh pattern of the analysis object in a six-plane body shape having eight mesh points according to the surface mesh pattern generated by the surface mesh generating means; quality evaluating means for evaluating quality of the surface mesh pattern generated by the surface mesh generating means according to the required quality, by determining internal angles of the mesh points of each mesh to the surface mesh pattern; and mesh correction means for shifting a surface mesh node point of a mesh not satisfying the required quality, according to the evaluation result obtained by the quality evaluating means, by selecting a node point of the mesh having an internal angle to the surface mesh, which deviates most from 90 degrees, and calculating a shift direction and a shift amount of the surface mesh node point to so that the internal angle of the selected node point to the surface mesh pattern approaches 90 degrees in an effort to improve the quality of the mesh pattern; wherein the internal mesh generating means, the quality evaluating means and mesh correction means repeat operations on a basis of a revised mesh pattern which incorporates the shift direction and the shift amount of the surface mesh node point.

2. The device for generating a mesh pattern for analysis as claimed in claim 1, wherein
the mesh correction means calculates the shift direction and the shift amount of the node point to shift the node point into a permissible error range an external surface and an external form line.

3. The device for generating a mesh pattern for analysis as claimed in claim 2, wherein
when the node point to improve the quality of the surface mesh is one of two points on the external form line of the shape model, the mesh correction means rotates, shifts, or extends/reduces the line connecting the two node points so as to shift the node point to improve the quality and together with this, shifts the node points existing on the line connecting the two node points on the external surface.

4. The device for generating a mesh pattern for analysis as claimed in claim 1, wherein
when the node point to improve the surface mesh is within a permissible error range.

5. The device for generating a mesh pattern for analysis as claimed in claim 4, wherein
the mesh correction means calculates the shift direction and the shift amount of the node point to shift the node point into a permissible error range from an external surface and an external form line.

6. The device for generating a mesh pattern for analysis as claimed in claim 5, wherein
when the node point to improve the quality of the surface mesh is one of two points on the external form line of the shape model, the mesh correction means rotates, shifts, or extends/reduces the line connecting the two node points so as to shift the node point to improve the quality and together with this, shifts the node points existing on the line connecting the two node points on the external surface.

7. A method for generating a mesh pattern formed of meshes for analysis, comprising:
generating a surface mesh pattern having quadrangular meshes, of an analysis object by acquiring shape model data on the analysis object and mesh control data including required quality of an analysis mesh model;
generating an internal mesh pattern of the analysis object in a six-plane body shape having eight mesh points according to the surface mesh pattern having been generated;
evaluating quality of the surface mesh pattern having been generated according to the required quality, by determining internal angles of the mesh points of each mesh to the surface mesh pattern; and
shifting a surface mesh node point of a mesh not satisfying the required quality, according to the evaluation result, by selecting a node point of the mesh having an internal angle to the surface mesh, which deviates most from 90 degrees, and calculating a shift direction and a shift amount of the surface mesh node point to so that the internal angle of the selected node point to the surface mesh pattern approaches 90 degrees in an effort to improve the quality of the mesh pattern; wherein the at least one of the generating a surface mesh pattern, the generating an internal mesh pattern, the evaluating quality of the surface mesh pattern and the shifting a surface node point operations, repeat on a basis of a revised mesh pattern which incorporates the shift direction and the shift amount of the surface mesh node point;
wherein at least one of the generating a surface mesh pattern, the generating an internal mesh pattern, the evaluating quality of the surface mesh pattern and the shifting a surface mesh node point, is effected using a processing device.

\* \* \* \* \*